(12) United States Patent
Suzuki (10) Patent No.: US 7,441,967 B2
(45) Date of Patent: Oct. 28, 2008

(54) DEVICE AND CAMERA

(75) Inventor: Shinji Suzuki, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 485 days.

(21) Appl. No.: 11/234,616

(22) Filed: Sep. 26, 2005

(65) Prior Publication Data

US 2006/0067679 A1    Mar. 30, 2006

(30) Foreign Application Priority Data

Sep. 27, 2004   (JP)   .............................. 2004-279375

(51) Int. Cl.
  *G03B 17/00*   (2006.01)
  *G02B 7/02*   (2006.01)
(52) U.S. Cl. ...................................... 396/531; 359/828
(58) Field of Classification Search ................. 396/529, 396/530, 531; 348/335, 360; 359/819, 827, 359/828
See application file for complete search history.

(56) References Cited

U.S. PATENT DOCUMENTS 5,644,441 A  *  7/1997  Hirasaki et al. ............. 359/828

FOREIGN PATENT DOCUMENTS

JP        01-159624 A     6/1989

* cited by examiner

*Primary Examiner*—Rodney E Fuller
(74) *Attorney, Agent, or Firm*—Sughrue Mion, PLLC (57) ABSTRACT

A camera includes a main unit which has an arc-shaped groove and a fixed hook formed on and projecting from the groove; and a bayonet ring which has, on the back face thereof, an arc-shaped projection to be engaged in the groove and a stop hook to go under the fixed hook and stopped by the fixed hook when the projection is engaged in the groove and rotated. The bayonet ring has a mark formed in a position on the front face thereof and a part of the bayonet ring which is furthest away from the mark is lifted by pressing the mark in a state that the bayonet ring is rotated up to a detachment position.

3 Claims, 9 Drawing Sheets

DEVICE AND CAMERA

BACKGROUND OF THE INVENTION

1. Field of the Invention

The present invention relates to a device having a bayonet ring that is attachable and detachable via a bayonet mechanism and to a camera typifying such a device.

2. Description of the Related Art

Conventionally, a bayonet mechanism has been widely used as a mechanism for freely attaching and detaching a ring-shaped member to and from a camera body. The bayonet mechanism includes: an arc-shaped groove and a fixed hook formed on and protruding from the arc-shaped groove, which are provided in a camera body; and an arc-shaped projection and a stop hook, which are provided in a ring-shaped member. The arc-shaped projection is to be engaged in the arc-shaped groove, and the stop hook is to go under the fixed hook and stopped by it when the arc-shaped projection is engaged in the arc-shaped groove and rotated.

For example, Japanese Patent Application Publication No. 1-159624 discloses a thin bayonet ring having elastic portions.

The bayonet ring disclosed in Japanese Patent Application Publication No. 1-159624 needs a force to bend the elastic portions at the time of attachment or detachment of the bayonet ring, and a user holds the side of the bayonet ring to operate it. Bayonet rings are usually operated in this way.

Recently, with the growth of the demand for thinner cameras, the demand for thinner bayonet rings is also growing. However, as for the case of the bayonet ring disclosed in Japanese Patent Application Publication No. 1-159624, it is difficult to make the bayonet ring thinner because the side of the bayonet ring needs to be held when it is operated. A bayonet ring whose side is not thick enough to be held may be conceived. A user needs to operate such a bayonet ring by holding the front face thereof with the fingers. The user can only push and rotate the top (front face) of the bayonet ring when attaching the bayonet ring to a camera body, and also can only push and rotate the top of the bayonet ring in a detachment direction when detaching it. However, there arises a problem of how to remove the bayonet ring from the camera body after it is rotated up to a detachment position.

For example, it is conceivable that the bayonet ring may be dropped by tapping the camera body while holding it with the front face facing downward. However, tapping the camera body is not desirable because a camera is delicate equipment. Moreover, the dropped bayonet ring may be damaged or the camera body itself may be dropped and damaged as well.

Alternatively, it is conceivable that the bayonet ring may be urged by a spring having a force to lift up the bayonet ring so that the bayonet ring can be automatically lifted up when it is rotated up to the detachment position. In this case however, a user needs to push the bayonet ring with a force strong enough to overcome the spring's force and needs to rotate it while pushing it when attaching the bayonet ring to the camera body, which requires techniques because the bayonet ring is unstable when placed on the camera body. Moreover, the fingers may be slipped from the front face of the bayonet ring because the user also needs to apply a force to rotate the bayonet ring, leading to low operability in attachment and detachment of the bayonet ring.

SUMMARY OF THE INVENTION

The present invention has been made in view of the above circumstances, and provides a device and a camera having a structure in which a bayonet ring can be easily attached and detached even if it is too thin to be operated while the side thereof is held.

A device according to the present invention includes:

a main unit which has an arc-shaped groove and a fixed hook formed on and projecting from the groove; and a plate-shaped bayonet ring which has, on the back face thereof, an arc-shaped projection to be engaged in the groove and a stop hook to go under the fixed hook and stopped by the fixed hook when the projection is engaged in the groove and rotated, wherein the bayonet ring has a mark formed in a predetermined position on the front face thereof and the projection has a notch at least in a backside of a portion including the position where the mark is formed so that the backside is isolated from the bottom of the groove, and wherein a part of the bayonet ring which is furthest away from the mark is lifted by pressing the mark in such a state that the bayonet ring is rotated up to a detachment position.

In the device according to the present invention, the projection to be engaged in the groove has a notch at least in a portion that is the backside of the portion where the mark is formed so that the backside of the position is lifted by pressing the mark. Therefore, the bayonet ring can be easily removed from the main unit of the device through an operation performed on the front face of the bayonet ring.

In the device according to the present invention, preferably, the main unit includes a locking mechanism which locks the bayonet ring to disable rotation of the bayonet ring being in a state that the stop hook is kept under the fixed hook and which unlocks the bayonet ring by operating an unlocking button disposed near the groove to enable free rotation of the bayonet ring in a detachment direction.

With this arrangement, the mark can be served both as a mark for positional adjustment in attachment and detachment of the bayonet ring and as a mark for depression of the bayonet ring. This avoids a confusion that may occur in a case in which marks are separately provided.

A camera according to the present invention includes an image-taking lens as well as an image-pickup device and generates an image signal by capturing a subject light coming through the image-taking lens by using the image-pickup device, including:

a camera body which has an arc-shaped groove formed in such a position as to surround the image-taking lens and a fixed hook formed on and projecting from the groove; and a plate-shaped bayonet ring which has, on the back face thereof, an arc-shaped projection to be engaged in the groove and a stop hook to go under the fixed hook and stopped by the fixed hook when the projection is engaged in the groove and rotated, wherein the bayonet ring has a mark formed in a predetermined position on the front face thereof and the projection has a notch at least in a backside of a portion including the position where the mark is formed so that the backside is isolated from the bottom of the groove, and wherein a part of the bayonet ring which is furthest away from the mark is lifted by pressing the mark in such a state that the bayonet ring is rotated up to a detachment position.

As described above, according to the present invention, it is possible to easily attach and detach the bayonet ring even if it is such a type that it only allows operations performed on the front face thereof.

DETAILED DESCRIPTION OF THE INVENTION

In the following, an embodiment of the present invention will be described.

Figure 1:
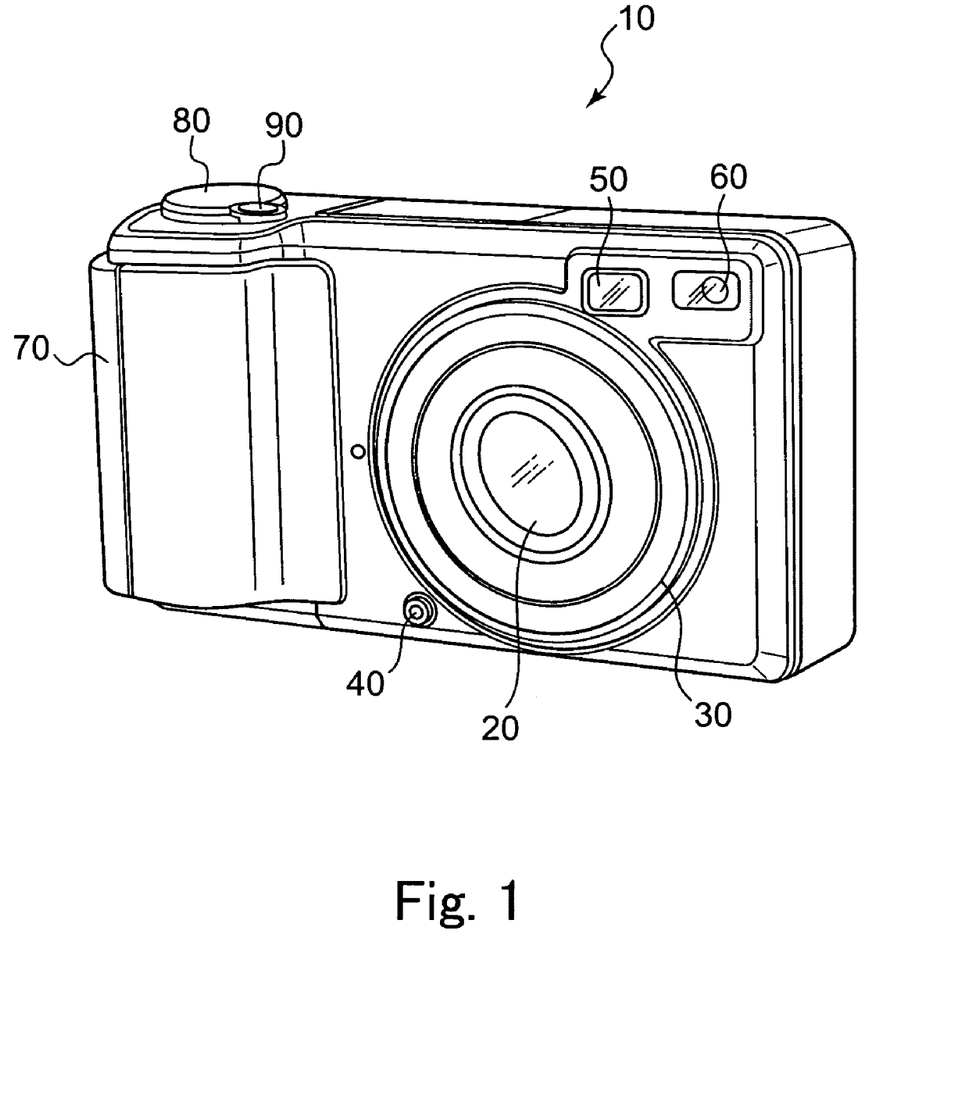
FIG. 1 is an external perspective view of a digital camera according to an embodiment of the device and the camera of the present invention.

FIG. 1 is an external perspective view of a digital camera according to an embodiment of the device and the camera of the present invention.

In the front face of a digital camera 10, an image-taking lens 20 is disposed facing outside and a bayonet ring 30 is attached thereto in such a position as to surround the image-taking lens 20. The bayonet ring 30 serves as a cosmetic cover and can be removed when an auxiliary lens such as a close-up converter lens is attached on the position where the bayonet ring has been attached. Near the bayonet ring 30, there is disposed an unlocking button 40 for unlocking the bayonet ring 30. On the front face of the digital camera 10, an optical finder objective window 50 and an auxiliary light emitting window 60 are also disposed. The digital camera 10 is also provided with a grip section 70 to be gripped by a hand.

On the top face of the digital camera 10, there are disposed a mode selecting dial 80 for selecting various modes and a shutter button 90 for giving image-taking instruction.

Further, there are disposed other components such as an image monitor for displaying images although they are not shown.

Figure 2A:
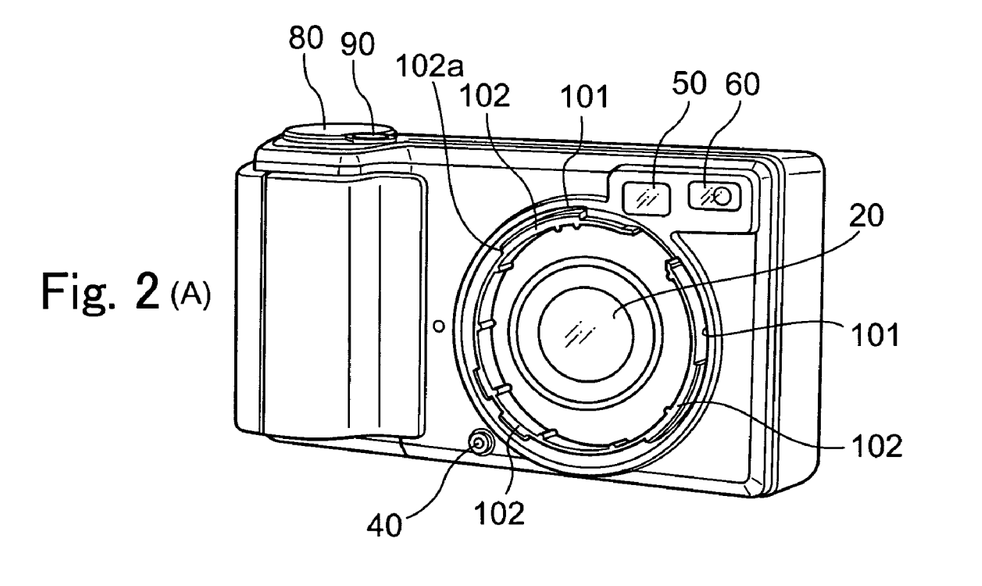
FIG. 2(A) is a diagram showing the digital camera shown in FIG. 1 with the bayonet ring removed.
Figure 2B:
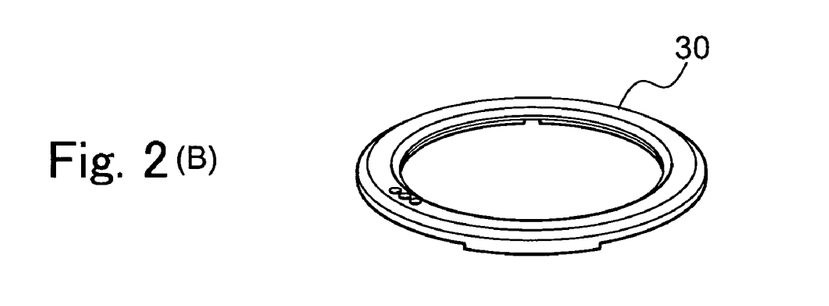
FIG. 2(B) is a diagram showing the removed bayonet ring.
Figure 3:
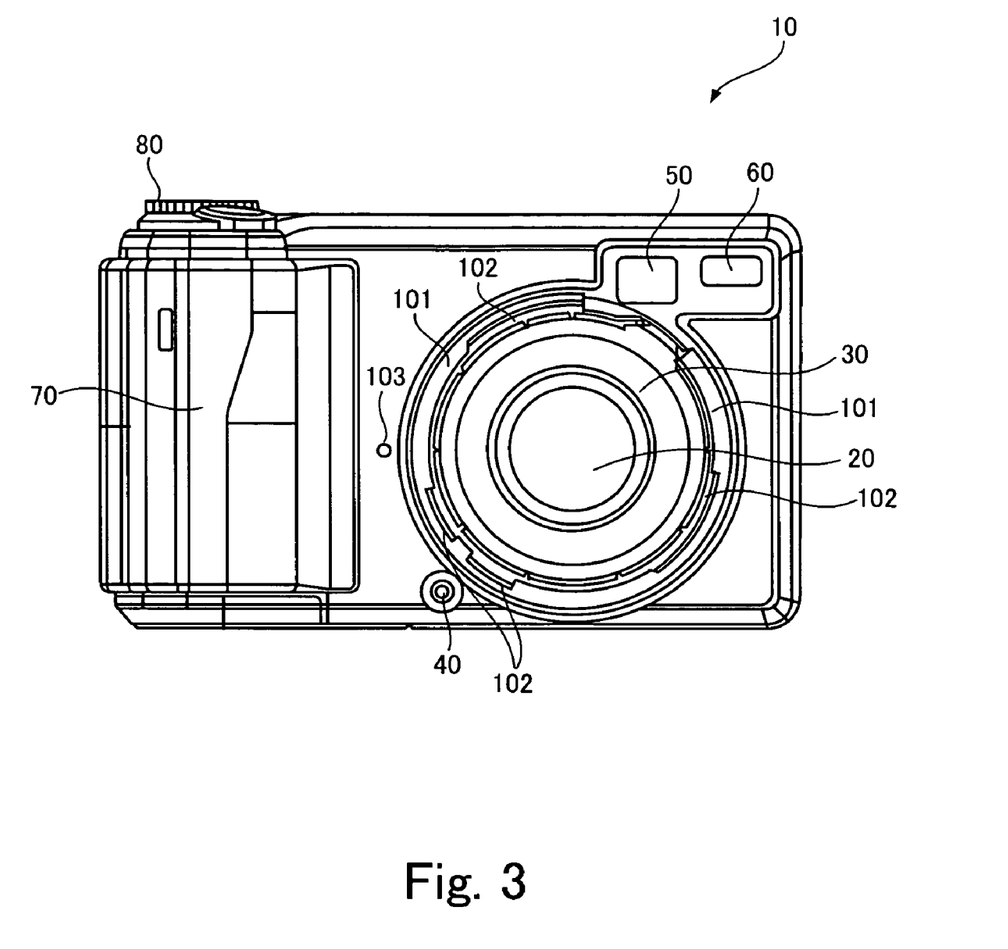
FIG. 3 is a front view of the digital camera with the bayonet ring removed.

FIG. 2(A) is a diagram showing the digital camera 10 shown in FIG. 1 with the bayonet ring removed and FIG. 2(B) is a diagram showing the removed bayonet ring. FIG. 3 is a front view of the digital camera 10 with the bayonet ring removed.

A bayonet ring mounting section of the camera body is provided with arc-shaped grooves 101 and fixed hooks 102 formed on and projecting from the grooves 101.

Figure 4A:
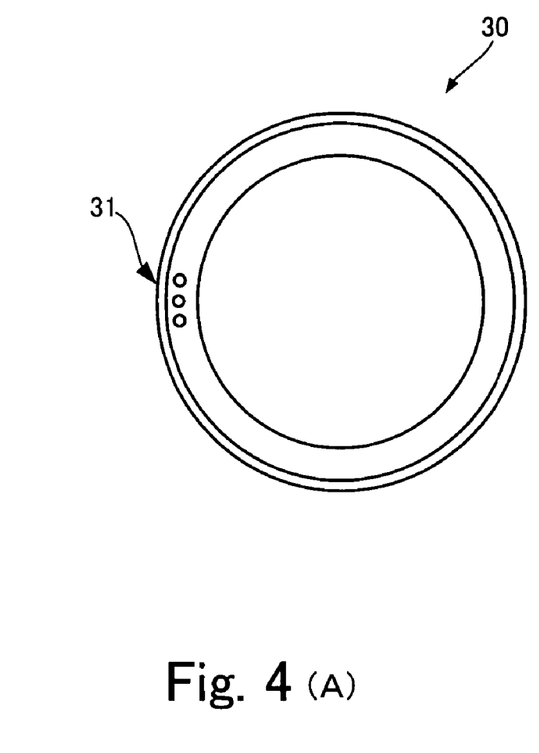
FIG. 4(A) is a plan view of the bayonet ring.
Figure 4B:
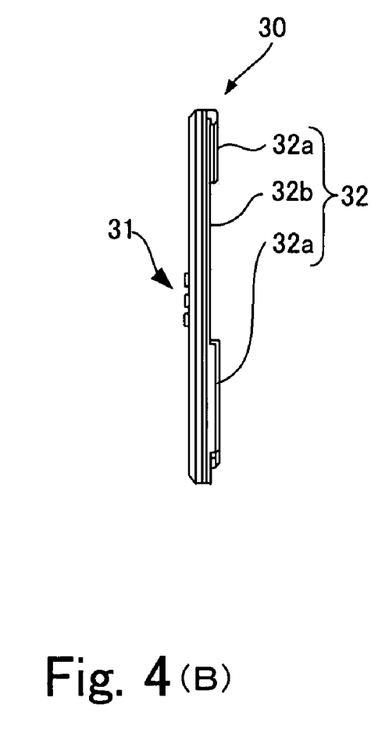
FIG. 4(B) is a side view of the bayonet ring.
Figure 4C:
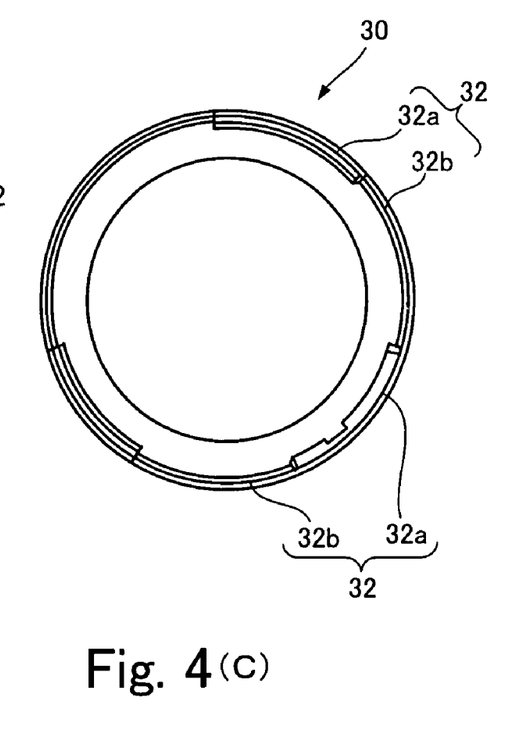
FIG. 4(C) is a back view of the bayonet ring.
Figure 5:
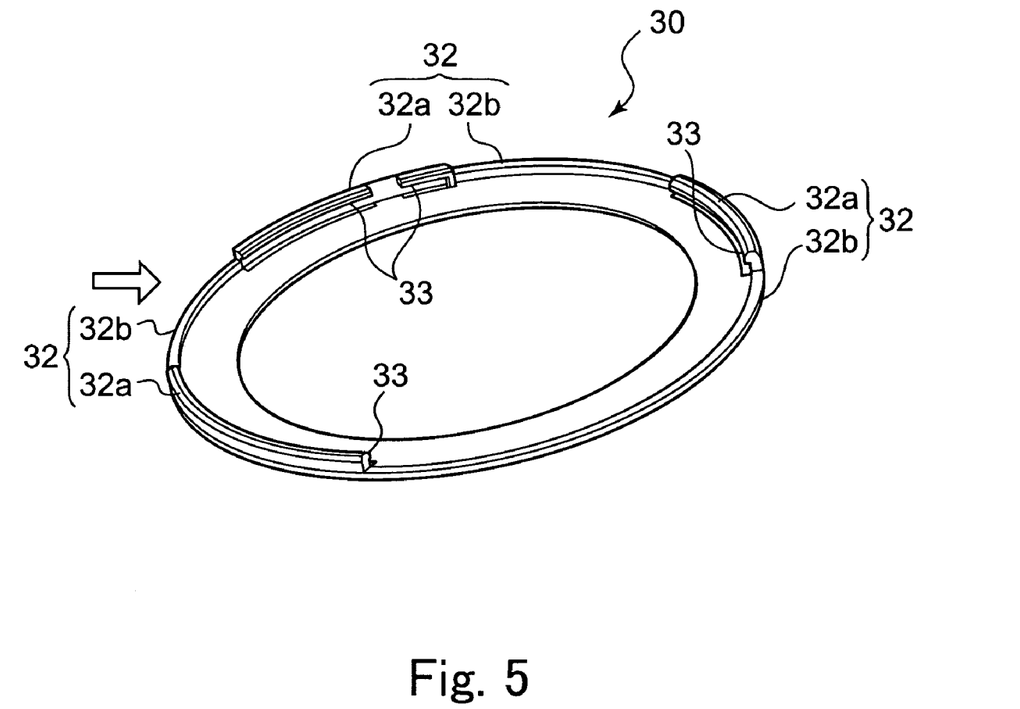
FIG. 5 is a perspective view of the back of the bayonet ring.

FIGS. 4(A), 4(B) and 4(C) are a plan view, a side view and a back view of the bayonet ring, respectively. FIG. 5 is a perspective view of the back of the bayonet ring.

There is a mark 31 on the front face of the bayonet ring 30. The mark 31 is composed of protrusions to be contacted by a finger and prevents the finger from slipping when the bayonet ring 30 is rotated.

Further, arc-shaped projections 32 are formed on the back of the bayonet ring 30. The arc-shaped projections 32 each have: a high portion 32a that is high enough to almost reach the bottom of the groove 101; and a low portion 32b that is notched so that it is isolated from the bottom of the groove 101. An arrow shown in FIG. 5 indicates a portion whose backside is provided with the mark 31 (see FIG. 4), i.e. the mark 31 is formed on the backside of a portion corresponding to the low portion 32b of the arc-shaped projection 32. In contrast, the high portion 32a of the arc-shaped projection 32 is provided with a stop hook 33 projecting towards the inner side of the bayonet ring 30.

The stop hook 33 goes under the fixed hook 102 and stopped by it when the projection 32 of the bayonet ring 30 is engaged in the groove 101 of the camera body and the bayonet ring 30 is rotated in the attachment direction.

Figure 6:
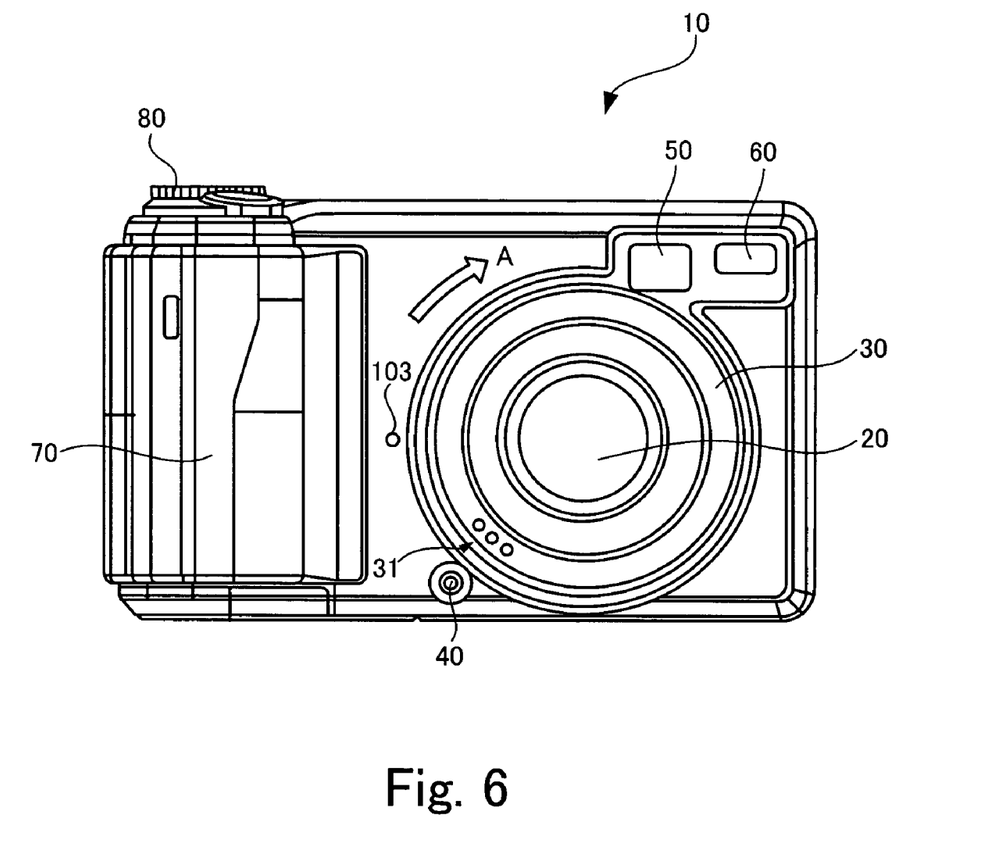
FIG. 6 is a front view of the digital camera with the bayonet ring rotated up to a detachment position.
Figure 7:
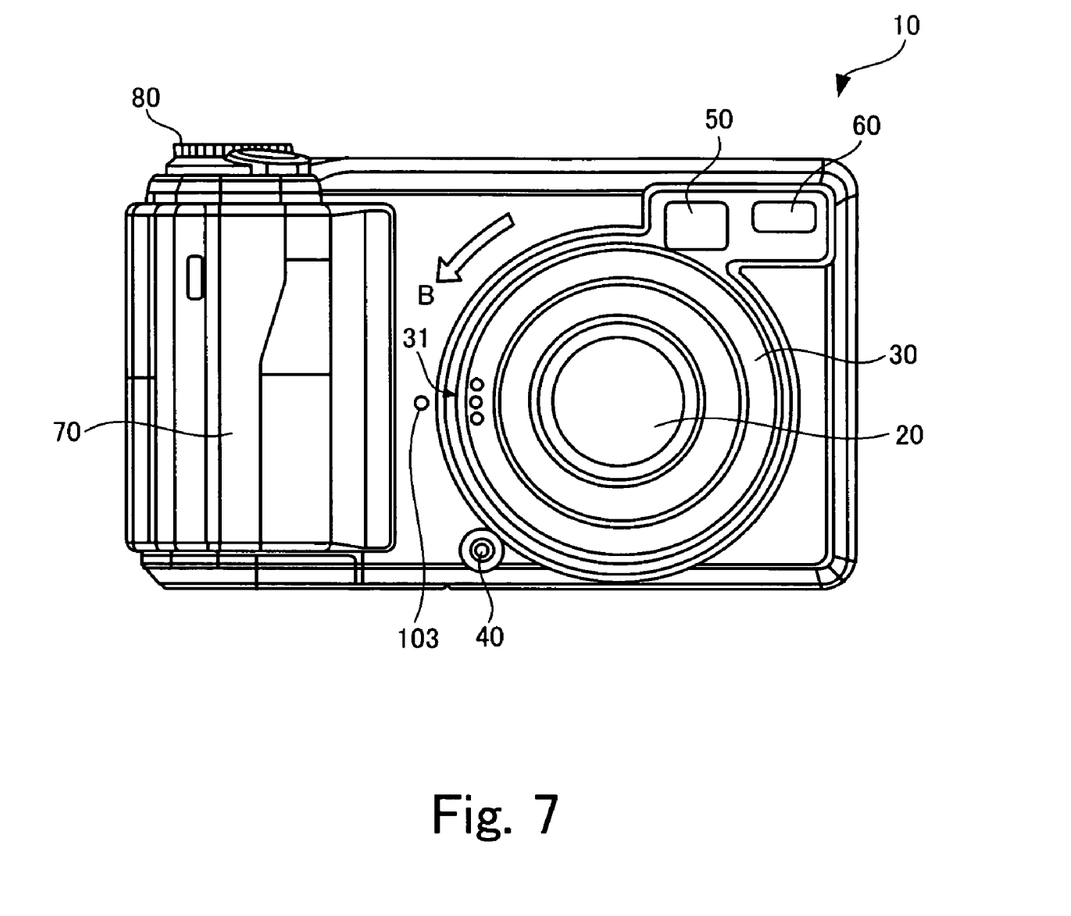
FIG. 7 is a front view of the digital camera with the bayonet ring rotated up to an attachment completing position.

FIG. 6 is a front view of the digital camera 10 with the bayonet ring 30 rotated up to a detachment position. FIG. 7 is a front view of the digital camera 10 with the bayonet ring 30 rotated up to an attachment completing position.

To attach the bayonet ring 30 to the camera body, as shown in FIG. 6, the bayonet ring 30 is placed on the grooves 101 (see FIG. 3) of the camera body by aligning the mark 31 with the unlocking button 40 and rotated in a direction shown by an arrow A. When the bayonet ring 30 is rotated and reaches a position where the mark 31 of the bayonet ring 30 is aligned with a mark 103 of the camera body, a stopper (not shown) provided on the back of the bayonet ring 30 abuts an edge of one of the fixed hooks 102 provided in the camera body. In this state, the bayonet ring 30 cannot be rotated any further. At the same time, the bayonet ring 30 is locked and cannot be rotated in a detachment direction shown by an arrow B.

This locking mechanism includes a locking member (not shown) that is urged in a direction projecting from the bottom of the groove 101 and projects towards the inner side of the groove 101. In this locking mechanism, when the locking member is retracted by being pushed by the high portion 32a of the projection 32 of the bayonet ring 30, and the bayonet ring 30 is rotated and set in a position shown in FIG. 7, the high portion 32a of the projection 32 is disengaged from the locking member, thereby allowing the locking member to project towards the inner side of the groove. In this way, the locking mechanism prevents the bayonet ring 30 from rotating in the detachment direction. When the unlocking button 40 is pressed, the locking member is retracted, enabling the bayonet ring 30 to rotate in the detachment direction (direction of the arrow B). The locking mechanism of the bayonet ring 30 is a conventional technique and thus no further description thereof will be provided.

Figure 8:
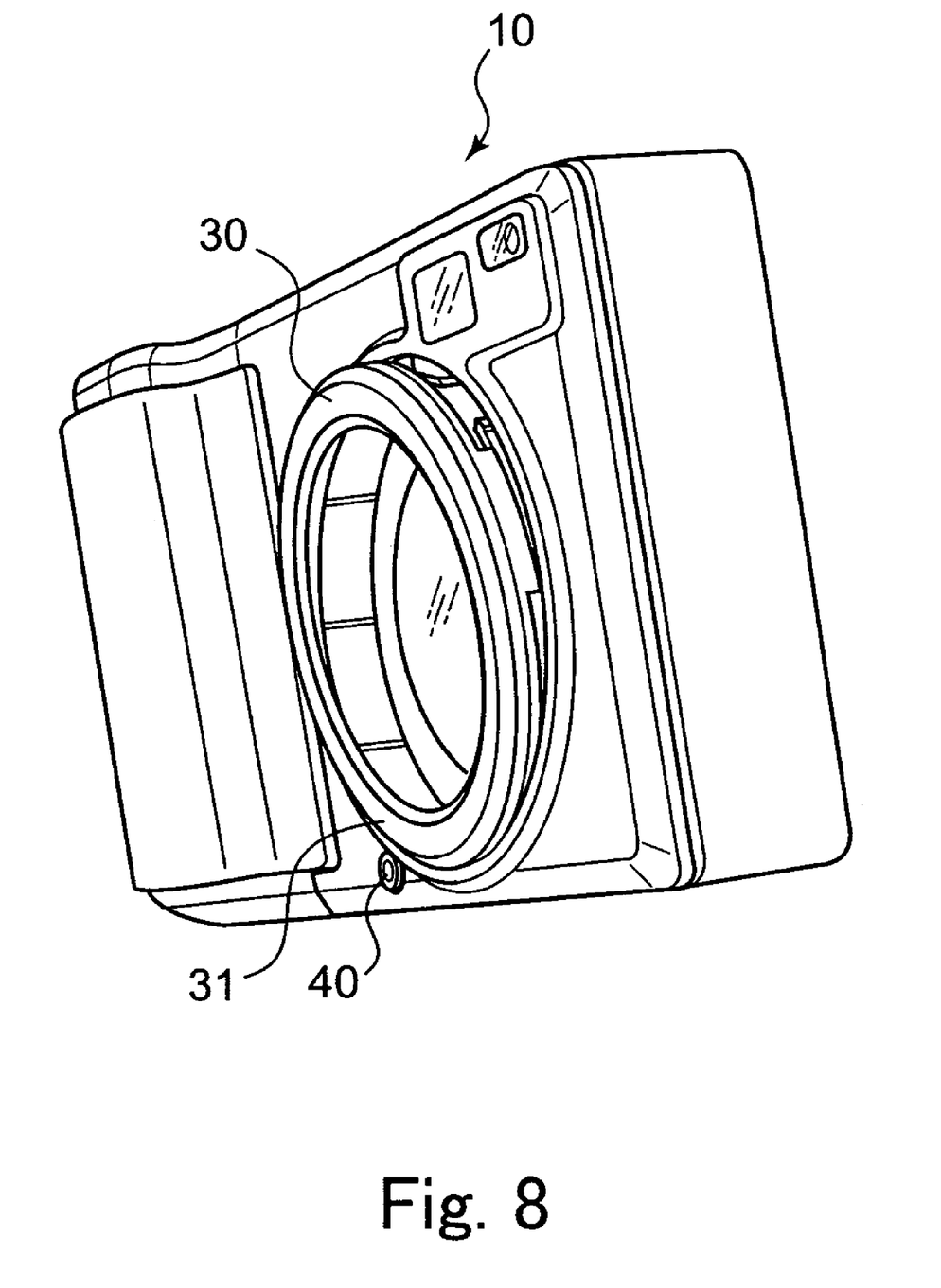
FIG. 8 is a view of the bayonet ring when a mark thereof is pressed in such a state that the bayonet ring is rotated up to the detachment position shown in FIG. 6.

FIG. 8 is a view of the bayonet ring 30 when the mark 31 is pressed in such a state that the bayonet ring 30 is rotated up to the detachment position shown in FIG. 6

The mark 31 of the bayonet ring 30 is formed in a portion whose backside corresponds to the low portion 32b of the projection 32. The low portion 32b is in such a state that it is isolated from the bottom of the groove 101 of the camera body. Therefore, when the mark 31 is pressed from the front face side, the part opposite the mark 31, i.e. the part that is furthest away from the mark 31, is lifted as shown in FIG. 8 so that a user can hold and remove the bayonet ring 30 from the camera body.

As described above, by using the digital camera 10, it is possible to easily attach and detach the bayonet ring 30 by operating the front face thereof.

Incidentally, as shown in FIG. 5 for example, there are other low portions 32b without being provided with the mark 31. If a portion except for the mark 31 is pressed and the pressed portion corresponds to one of the low portions 32b of the projection 32, the part opposite the pressed portion can be lifted. In this way, it is possible to lift up the bayonet ring 30 by pressing a portion other than the mark 31. However, if there is no mark, a user may be puzzled in figuring out which part of the bayonet ring 30 he/she should press. In the present embodiment, because one of the points any of which can cause the bayonet ring 30 to be lifted upon depression is indicated with the mark 31, a user can feel comfortable as he/she is aware that the bayonet ring 30 can be lifted only by pressing the mark 31.

Alternatively, these other points, any of which can cause the bayonet ring 30 to be lifted upon depression, may be provided with marks in addition to the mark 31. However, the additional marks must be made distinguished from the mark 31, or the positions and shapes of the grooves 101, fixed hooks 102, and stop hooks 33 must be so modified as to allow the bayonet ring 30 to be attached/detached when any of the additional marks is aligned with the unlocking button 40.

Figure 9:
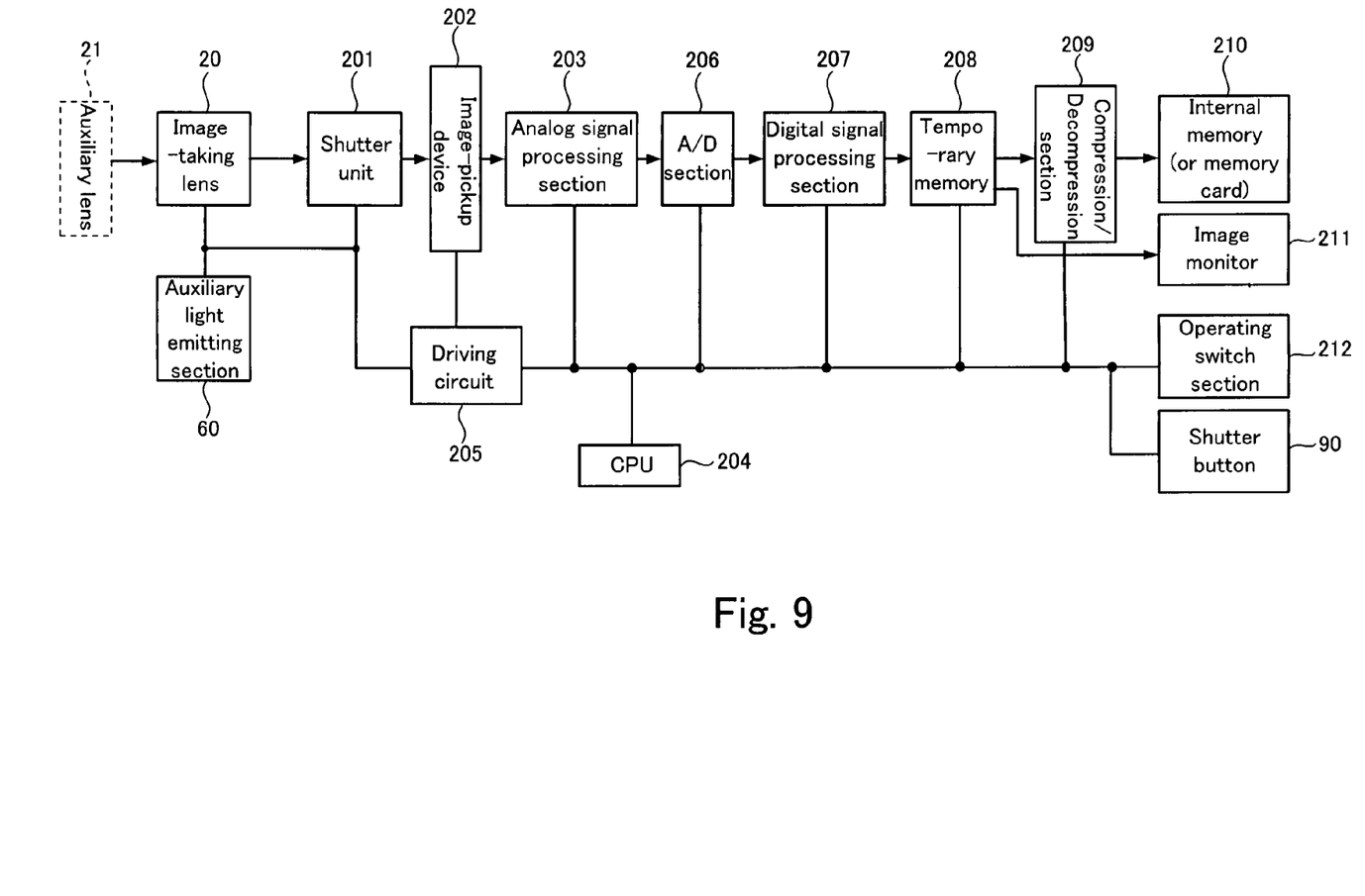
FIG. 9 is a block diagram showing a circuit structure of the digital camera.

FIG. 9 is a block diagram showing a circuit structure of the digital camera described so far.

As shown in FIG. 1, the digital camera 10 is provided with the image-taking lens 20 and an auxiliary light emitting section 60. In addition, an auxiliary lens 21 such as a close-up converter lens can be attached to the digital camera 10 by using the bayonet mechanism of the camera body.

Further, the digital camera 10 is provided with a shutter unit 201, an image-pickup device (CCD) 202, an analog signal processing section 203, a CPU 204 for integrally controlling the operations of the digital camera 10, a driving circuit 205, and an A/D (analog/digital) section 206.

The image-taking lens 20, the auxiliary light emitting section 60, the shutter unit 201, and the image-pickup device 202 operate in response to signals from the driving circuit 205. When the auxiliary lens 21 is attached, a subject light passing through the auxiliary lens 21, the image-taking lens 20, and the shutter unit 201 enters the image-pickup device 202. The image-pickup device 202 converts the entered subject light into an analog image signal that is an electrical signal and outputs it to the analog signal processing section 203.

The analog signal processing section 203 applies noise reduction processing and the like to the analog image signal received from the image-pickup device 202 and outputs the processed analog image signal to the A/D section 206. The A/D section 206 converts the received analog image signal and into a digital image signal and outputs the converted signal.

The digital camera 10 is also provided with a digital signal processing section 207, a temporary memory 208, a compression/decompression section 209, an internal memory (or memory card) 210, and an image monitor 211. The digital image signal obtained in the A/D section 206 is input to the digital signal processing section 207. The digital signal processing section 207 applies predetermined digital signal processing to the input digital image signal and completes image data representing a subject image of the taken scene. Subsequently, the completed image data is temporarily stored in the temporary memory 208. The data stored in the temporary memory 208 is compressed by the compression/decompression section 209 and stored in the internal memory (or memory card) 210. Depending on the image-taking mode, image data may be directly stored in the internal memory 210 without being compressed. The data stored in internal memory 210 is read out and input to the image monitor 211 so that an image of the subject is displayed on the image monitor 211.

Furthermore, the digital camera 10 is provided with: an operating switch section 212 composed of the mode selecting dial 80 and the like; and the shutter button 90. To take an image, a user sets a desired image-taking condition by operating the operating switch section 212 and then presses the shutter button 90. Subsequently, there is performed processing such as generation of image data and storing of the generated image data in the internal memory 210 as described above.

What is claimed is:

1. A device comprising:
    a main unit which has an arc-shaped groove and a fixed hook formed on and projecting from the groove; and
    a plate-shaped bayonet ring which has, on the back face thereof, an arc-shaped projection to be engaged in the groove and a stop hook to go under the fixed hook and stopped by the fixed hook when the projection is engaged in the groove and rotated,
    wherein the bayonet ring has a mark formed in a predetermined position on the front face thereof and the projection has a notch at least in a backside of a portion including the position where the mark is formed so that the backside is isolated from the bottom of the groove, and wherein a part of the bayonet ring which is furthest away from the mark is lifted by pressing the mark in such a state that the bayonet ring is rotated up to a detachment position.

2. The device according to claim 1, wherein the main unit includes a locking mechanism which locks the bayonet ring to disable rotation of the bayonet ring being in a state that the stop hook is kept under the fixed hook and which unlocks the bayonet ring by operating an unlocking button disposed near the groove to enable free rotation of the bayonet ring in a detachment direction.

3. A camera which includes an image-taking lens as well as an image-pickup device and generates an image signal by capturing a subject light coming through the image-taking lens by using the image-pickup device, comprising:
    a camera body which has an arc-shaped groove formed in such a position as to surround the image-taking lens and a fixed hook formed on and projecting from the groove; and
    a plate-shaped bayonet ring which has, on the back face thereof, an arc-shaped projection to be engaged in the groove and a stop hook to go under the fixed hook and stopped by the fixed hook when the projection is engaged in the groove and rotated,
    wherein the bayonet ring has a mark formed in a predetermined position on the front face thereof and the projection has a notch at least in a backside of a portion including the position where the mark is formed so that the backside is isolated from the bottom of the groove, and wherein a part of the bayonet ring which is furthest away from the mark is lifted by pressing the mark in such a state that the bayonet ring is rotated up to a detachment position.

\* \* \* \* \*